(12) United States Patent
Daymond et al.

(10) Patent No.: US 9,225,847 B2
(45) Date of Patent: Dec. 29, 2015

(54) COMMUNICATION NETWORK SUBSCRIPTION CONTROL

(75) Inventors: Andrew Daymond, Tampere (FI); Uwe Schwarz, Veikkola (FI); Jens Benner, Copenhagen (DK); Ossi Pöllänen, Espoo (FI); Jan Chipchase, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 479 days.

(21) Appl. No.: 11/545,880

(22) Filed: Oct. 10, 2006

(65) Prior Publication Data
US 2008/0086371 A1 Apr. 10, 2008

(30) Foreign Application Priority Data
Oct. 9, 2006 (FI) .................................... 20060895

(51) Int. Cl.
*H04M 15/00* (2006.01)
*G06Q 30/02* (2012.01)
*G07F 17/00* (2006.01)
*H04W 4/24* (2009.01)

(52) U.S. Cl.
CPC ......... *H04M 15/745* (2013.01); *G06Q 30/0255* (2013.01); *G06Q 30/0273* (2013.01); *G07F 17/0042* (2013.01); *H04M 15/00* (2013.01); *H04M 15/81* (2013.01); *H04M 15/88* (2013.01); *H04M 15/886* (2013.01); *H04W 4/24* (2013.01); *H04M 2215/0108* (2013.01); *H04M 2215/0112* (2013.01); *H04M 2215/0116* (2013.01); *H04M 2215/0136* (2013.01); *H04M 2215/0168* (2013.01)

(58) Field of Classification Search
CPC ... H04M 15/888; H04M 15/00; H04M 15/70; H04M 15/73; H04M 15/88; H04M 15/885; H04M 15/886; H04M 15/887; H04M 3/38; H04M 3/2218; H04M 3/382; H04M 2215/0116; H04M 2215/0132; H04M 2215/0136; H04M 2215/014; H04M 2215/70; H04M 2215/7072; H04W 88/18; H04W 88/02
USPC .......................................... 455/405, 411, 434
See application file for complete search history.

(56) References Cited

U.S. PATENT DOCUMENTS

| | | | |
|---|---|---|---|
| 2002/0077108 A1* | 6/2002 | Loureiro et al. | 455/449 |
| 2002/0126820 A1* | 9/2002 | Barak et al. | 379/219 |
| 2003/0072425 A1* | 4/2003 | Hurst | 379/114.01 |
| 2004/0076128 A1 | 4/2004 | Rao et al. | 370/328 |
| 2004/0092248 A1 | 5/2004 | Kelkar et al. | 455/411 |
| 2005/0186940 A1* | 8/2005 | Schatzberger et al. | 455/406 |
| 2006/0094398 A1 | 5/2006 | Chaar et al. | 455/405 |
| 2007/0136195 A1 | 6/2007 | Banjo | 705/43 |

FOREIGN PATENT DOCUMENTS

| | | |
|---|---|---|
| CN | 1711745 A | 12/2005 |
| EP | 0 796 023 A2 | 9/1997 |
| KR | 20050011937 A | 1/2005 |

(Continued)

*Primary Examiner* — Nizar Sivji
(74) *Attorney, Agent, or Firm* — Harrington & Smith

(57) ABSTRACT

A method and corresponding equipment to enable a phone owner, who desires to lend a phone to a borrower, to define a temporary limit for the usage of the borrower, especially in a prepaid charging system. The charging system uses this temporary limit to restrict service usage such that when an amount corresponding to the temporary limit has been spent service is denied until such time as the limit has expired or been withdrawn, even if, for example, there is still a positive balance in the phone owner's own prepaid account.

18 Claims, 3 Drawing Sheets

(56) References Cited

FOREIGN PATENT DOCUMENTS

| TW | 200412114 A | 7/2003 |
| WO | WO-99/30262 A1 | 6/1999 |
| WO | WO 03094495 A1 * | 11/2003 |
| WO | WO 2004/059964 A1 | 7/2004 |
| WO | WO-2008/110658 A1 | 9/2008 |

* cited by examiner

COMMUNICATION NETWORK SUBSCRIPTION CONTROL

FIELD OF THE INVENTION

The present invention generally relates to communication network subscription control. The invention relates particularly, though not exclusively, to temporary controlling of mobile telecommunications subscriptions.

BACKGROUND OF THE INVENTION

Over past decades, mobile telecommunications networks have become the primary solution also in the growing markets. Inexpensive to deploy and yet capable to host significant amounts of subscribers, mobile telecommunications networks are connecting ever increasing amounts of cities, towns and villages. However, as mobile telecommunications networks are built to developing markets, an increasing portion of potential users is unable to purchase a personal mobile telephone. When needed users may borrow or rent a phone from a friend, relative or kiosk, for example. Of course, the borrower should cover the subscription charging incurred by her use. To this end, there are particular pre-paid subscriptions associated with a predetermined balance on a charging account and possibly capable of being topped up. The topping up may take place by using a dedicated machine or even by using a scratch card as described in WO2004059964A1 assigned to the patentee of this patent application.

If a mobile phone is lent to a borrower, the lender should remove her Subscription Identity Module (SIM) to prevent the borrower from using it. Typically, this means that at least the battery of the phone has to be detached to access the SIM and often a cover should be detached before the battery can be accessed and detached. The feature that the battery should cover the SIM or somehow inhibit detaching of the SIM while the phone is switched on may be partly caused by the need to protect the SIM as the mobile telephones are not generally designed such that the SIM could be safely detached anytime. Further, the detached SIM should be preserved over the period the mobile telephone is lent such that its contacts would not become dirty or greasy. The mobile telephone is also subjected to two SIM removals and insertions each time the mobile telephone is lent and the lender's SIM has to be re-inserted before the operability of the mobile telephone can be tested as otherwise the phone typically stops on starting to prompt "Insert SIM". Finally, the pre-paid subscriptions may simply be unsuitably expensive for the borrower or their topping up inaccessible at the moment the phone should be lent. Hence, there is a need for facilitating the lending of a telephone subscription to a borrower.

It could be useful to build an application that would control the use of the mobile phone based on network provided charging information such that the use could be restricted according to particular limits. GSM Advice of Charge (AoC) supplementary services, for instance, allow the tariff for a call to be indicated to the mobile phone. This information could be used to calculate the cost of the call and therefore disconnect the call internally when the limit is reached. However, the calculation of call duration in the phone is different from the calculation in the network leading to differences in the actual amount charged to the subscriber and the cost of the call as determined by the phone. The AoC also has limitations in terms of how the tariffs are defined and which services tariffs can be provided for.

It is an object of the invention to avoid or at least to mitigate present problems.

SUMMARY

According to a first aspect of the invention there is provided a method comprising:
  allowing a subscriber of a communication network to define a temporary limit to the use of an associated network subscription;
  providing the temporary limit to the network; and
  controlling the use of the subscription in accordance with the temporary limit.

The temporary limit may be controlled by the network.

Advantageously, thanks to controlling the temporary limit by the network, the method of the first aspect may be supported by presently existing subscriber equipment.

By controlling the temporary limit by the network, the use of the subscription need not be subjected to added delays. Further, by controlling the temporary limit by the network, the temporary limit may be controlled using pre-existing equipment and the temporary limit may be controlled using the exact charging that is applied by the network so that mismatch between actual charging and controlling of the limit may be avoided.

The temporary limit may contain any combination of the following: a monetary amount or a unit amount; a start date for application of the limit; a start time for application of the limit; an end date for expiry of the limit; an end time for expiry of the limit; the number of service events the limit applies to; and tariffing information elements.

The temporary limit may be provided to the network with any of the following mechanisms: In-band signaling, for instance communicating a temporary limit from the subscriber as part of service usage and out-of-band signaling, for instance communicating the temporary limit by separate messaging from the subscriber to the network.

The in-band signaling may contain by using a pre-determined part of a dial string such as a prefix or postfix, by including temporary limit related information in the destination address of a message or by inserting the temporary limit in the text of a message. The message may be a short message, a multimedia message or a message of any other type.

The out-of-band signaling may contain communicating the temporary limit by separate messaging from the phone to the network using one of the following mechanisms: Short message service (SMS) messaging; Unstructured Supplementary Service Data (USSD) interaction; accessing a predetermined intranet address; accessing a predetermined internet address; using an Internet Protocol (IP) signaling; making a voice call to a predetermined service number; and making a voice call to a predetermined toll-free service number.

The temporary limit may be provided to the network using existing signaling circuitry and/or messages. Hence, added requirements to signaling circuitry and/or capacity may be avoided.

The subscriber may be provided with a warning reaching the temporary limit as a warning of termination of current use of the subscription. The warning may be provided by a tone, announcement or message produced for the subscriber. The tone may comprise advice or remaining amount of use and/or balance related to the temporary limit.

The subscriber may be provided with a user interface specifically adapted to input the temporary limit. This may result in both relatively convenient and accurate setting of the temporary limit.

The network may contain a charging system. The controlling of the use of the subscription in accordance with the temporary limit may contain creation of a temporary account in the charging system corresponding to the use of the subscription up to the temporary limit.

The temporary account may be configured to have a predetermined balance or a balance corresponding to the temporary limit.

The subscriber may be associated with a subscriber's account.

The temporary limit may define for the subscriber's account any of the following: a monetary amount or a unit amount; a start date for application of the limit; a start time for application of the limit; an end date for expiry of the limit; an end time for expiry of the limit; the number of service events the limit applies to; and tariffing information elements.

The subscription may be a prepaid subscription. The charging system may be configured to monitor the use of services from both the normal prepaid account and the temporary account concurrently so that service usage is barred when either account is spent.

The temporary limit may be removed automatically after the temporary limit has been met. Alternatively, temporary limit may be removed after the subscriber has issued a predetermined code.

The temporary limit may be defined in the charging system for a prepaid subscription by setting a balance limit offset from zero such that the remaining spending corresponds to the temporary limit.

The charging system may include a first functional unit configured to control the charging and use of the subscription and a second functional unit configured to control the temporary limit.

Both the first and second functional unit may control respectively the subscriber's account and the temporary limit in order to deny use in excess to the subscriber's account and the temporary limit.

The temporary limit may be removed by stopping the use of the second functional unit in connection with the subscription.

Either or both of the first functional unit and second functional unit may be an intelligent network unit capable of implementing prepaid subscription charging system.

According to a second aspect of the invention there is provided a method comprising:
  receiving from a subscriber of a communication network a temporary limit to the use of an associated network subscription; and
  controlling the use of the network subscription in accordance with the temporary limit.

Various embodiments of the present invention have been illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED DESCRIPTION

Various non-restricting embodiments of the invention will next be described. In brief, an embodiment of the invention is directed to enabling a phone owner, who desires to lend a phone to a borrower, to define a temporary limit for the usage of the borrower, especially in a prepaid charging system. The charging system uses this temporary limit to restrict service usage such that when an amount corresponding to the temporary limit has been spent service is denied until such time as the limit has expired or been withdrawn, even if, for example, there is still a positive balance in the phone owner's own prepaid account.

In one embodiment of the invention, the sub-account is initialized with a balance transfer from the main account (with an amount corresponding to the temporary limit) and is then charged instead of the main account down to zero. If the temporary limit is removed before the sub-account balance reaches zero, the remaining balance of the sub-account is in one embodiment kept by the operator and in another embodiment fully or partly refunded to the main account. In other embodiments, the sub-account is not initialized corresponding to the temporary limit, but instead the charging is carried out on the main account so that the charges are accumulated in a temporary balance up to the amount of the temporary limit (or decremented from an initial value of the temporary limit down to zero).

Figure 1:
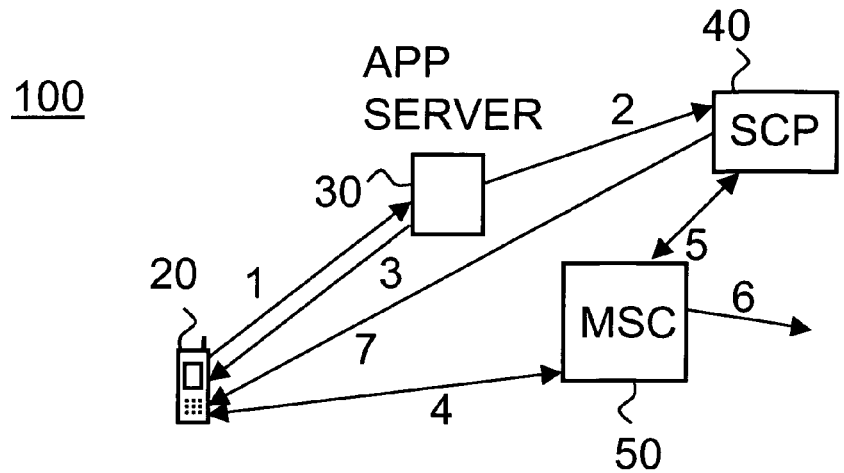
FIG. 1 shows schematically a system according to an embodiment of the invention.

FIG. 1 shows schematically a system 100 according to an embodiment of the invention. The system comprises a subscriber terminal 20, an application server 30 accessible to the subscriber terminal 20, a service control point (SCP) 40 accessible to the application server 30, and a switch centre 50, in this example a Mobile Switch Centre (MSC) 50. The subscriber terminal 20 and switch centre are depicted as mobile subscriber terminal 20 and mobile switch centre 50, whilst the invention is not restricted to mobile networks and devices. FIG. 1 suppresses any intervening network elements in sake of simplicity of description.

To facilitate the following description, the subscription that the subscriber controls and uses, and that has an associated account for charging, can be referred to as a main account. Further, the use of the subscription within bounds of a temporary limit defined as explained in the following, can be referred to as using a sub-subscription and respectively an actual or virtual account for charging purpose can be referred to as a sub-account.

In order to apply a temporary limit to her subscription (main-subscription), a user of the subscriber terminal 20 first defines the temporary limit and then causes the terminal 20 to send an initiation signal 1 to the application server in order to create a sub-account.

In an embodiment of the invention, the temporary limit contains one or more of the following items: a monetary amount or a unit amount; a start date for application of the limit; a start time for application of the limit; an end date for expiry of the limit; an end time for expiry of the limit; the number of service events the limit applies to; and tariffing information elements. In yet further embodiment of the invention, the temporary limit contains a maximum rate in which charging is allowed to be induced such as a maximum daily, weekly, monthly or yearly rate. This embodiment is also useful when the subscription is lent for a longer period.

In an embodiment of the invention, the tariffing information elements are adapted to modify the tariffing of the subscriber while the temporary limit applies. For instance, a network operator may provide special rates for particular types of subscription lending. Moreover, in an embodiment of the invention, a network operator allows the subscriber to price the lent subscription more or less expensive than the actual subscription terms provide for the lent subscription. If the tariffing is modified more expensive than usually, in a further embodiment the network operator charges the balance of the sub-subscription less than the main subscription. Hence, the network operator can award the main subscription for providing a temporary sub-account and thus increasing revenue of the network operator.

The initiation signal is in one embodiment provided by means of in-band signaling.

In an alternative embodiment, the initiation signal is provided by means of out-band signaling. For instance, if a call is to be limited then the temporary limit is provided in an embodiment of the invention as part of the call setup info such as dialled number, calling party number or calling party category and if a short messaging is to be limited then the limit info is provided in an embodiment of the invention along with the short message submission, for instance as part of the destination address, SMSC address or embedded in the short message content. Dedicated SMS or Unstructured Supplementary Service Data (USSD) messaging is used in different embodiments making use of the out-band-signaling by transferring the temporary limit generally independently of the service to be limited.

It should be noticed that the application server is needed for out-of-band signaling, mainly to receive the out-of-band signaling and to pass the out-band signaling to the charging system. Further, in an embodiment of the invention, the application server is a part of the charging system.

In-band signaling does not need the application server since the switching equipment already receives the service signaling so that the service can be initiated and can pass the in-band signaled temporary limit to the charging system.

It is indeed an advantage of in-band signaling, that the switching equipment need not be modified if the limit information can be passed transparently with the information it would normally pass to the charging system (for instance, information embedded in the called number of a call setup). However, the switching equipment is modified in an alternative embodiment where necessary to specifically identify the temporary limit to the charging system, to pass the temporary limit to the charging system in addition to the normal information the switching equipment would provide and possibly to remove the temporary limit in order to be able to complete the service initiation.

The out-band signaling in different embodiments uses SMS messaging for sending a temporary limit to an applicable network application, USSD interaction between the subscriber terminal and an applicable network application, accessing a Wireless Application Protocol (WAP) portal accessible to an applicable network application and IP signaling such as Session Initiation Protocol (SIP) signaling, Hypertext Transfer Protocol (HTTP), TCP/IP (TCP, Transfer Control Protocol), or File Transfer Protocol (FTP) from the subscriber to the network application. The application server 30 is, in different embodiments of the invention, capable of acting as a signaling server for the USSD interaction or the SMS interaction.

In an embodiment of the invention, the in-band signaling for a voice call makes use of a postfix or prefix, such as a dial string. For example, by dialing at +123456789#2*50 the subscriber can indicate that the call to the number +123456789 should be limited to 2.50 EUR. In this case the dial string will be communicated to the prepaid charging system and can be analyzed there to extract the information. The call can then be connected by removing the temporary limit to obtain the intended destination routing address (B-party number).

In an embodiment of the invention, in-band signaling for a Short Message (SM) includes a temporary limit either in the destination number as in case of voice call or in the body or text of the message itself.

In general, any parameter from the service setup information sent by the phone that is transferred in the signaling to the prepaid platform can be used to encode and convey the temporary limit.

At simplest, according to one embodiment of the invention, the temporary limit is entered directly by the phone user. In another embodiment, the temporary limit is inserted transparently by the subscriber terminal. The inserting of the temporary limit is realized in one embodiment by changing the dialled number to appropriate format or by sending a hidden message such as short message of the short messaging service based on some previous user input received on the subscriber terminal's user interface. The entry of the temporary limit is also exemplified and described in more detail in connection with FIG. 6.

According to an embodiment of the invention, the network or typically its charging system is capable of creating a temporary account as the sub-account. In this embodiment, when the temporary limit is received, the charging system creates a temporary account for the subscriber with a balance equal to the amount (of money or units) provided. In another embodiment, the charging system configures as the sub-account a pre-configured account that has been reserved for this purpose.

The sub-account is configured in one embodiment to have further account parameters such as the start and/or expiry date and/or time of the account or the number of events for which the account is valid based on information provided with the temporary limit signaling by the subscriber terminal.

Once the sub-account has been configured, the prepaid system typically monitors the service usage of both the main account and of the sub-account concurrently so that service usage is barred when either account becomes spent, that is, no more suffice to cover a further charging unit.

The temporary sub-account, and thus also the spending limit, is removed (or de-activated) in one embodiment immediately after the sub-account has been used for telecommunication service or services, particularly but not necessarily so if the limit information provided indicated the limit applied only to one sub-account usage event such as placing a phone call or sending short message or Multimedia Messaging service (MMS) message. In another embodiment, the spending limit is removed later on expiry or on request from the phone owner. This later removal is particularly useful if the temporary limit indicated a limit to be applied to multiple service usage events. The removal is subject to obtaining a PIN authentication or biometric authentication from the subscriber.

Alternative to configuring a further account to function as the sub-account, in one embodiment the main account itself is used to provide the sub-account by temporarily changing the limit on the normal prepaid account that is typically set to zero to correspond to the current balance subtracted by an amount corresponding to the spending limit associated to the sub-account. For example, if the current balance on the main account that is a prepaid account is 5 EUR and the temporary limit indicates a limit for service usage of 0.70 EUR then the normal prepaid account limit is temporarily changed to 4.30 EUR instead of 0 EUR in this embodiment. In this case, the charging on the prepaid main account is performed as normal except that when the account reaches the temporary limit of 4.30 EUR cost-bearing service is denied. In order to remove the temporary limit, the account limit is reset to the previous level (e.g. 0 EUR) either immediately after the service usage, especially if the temporary limit indicated that the limit applied only to one service usage event. On the other hand, particularly if the temporary limit applied to multiple service usage events, the temporary limit is typically removed on expiry of the temporary limit or on a separate request from the phone owner. Such a request is authenticated in one embodiment by prompting a personal identity number or by any other means such a biometric authentication.

Main signaling according to one embodiment in a system 100 of FIG. 1 comprises:

- sending from the subscriber terminal 20 a temporary limit signal 1. This signal typically has the form of "Apply temporary limit X" short message or USSD message.
- In the application server 30, an application forwards information containing the temporary call limit to the SCP 40 using a signal 2.
- The application server then sends a confirmation message 3 to the subscriber terminal 20 as a confirmation that the temporary call limit has been duly received and processed by the subscriber's network.
- Next, a call is normally placed by the sub-subscriber as depicted by signaling 4. Before the call is being established, the MSC 50 feeds in one embodiment an announcement to the subscriber terminal 20. The announcement typically contains an indication of the presence of the temporary limit and/or the balance of the sub-account.
- The call is triggered by signaling 5 to the SCP 40 as if it were a normal prepaid call. In case of in-band signaling, the sending from the subscriber terminal 20 of a temporary limit signal and placing the call take place at the same time so that the information provided in signaling 5 includes the temporary limit, defined for instance by a postfix or prefix on the called number. The SCP provides to the MSC in one embodiment of the invention the modified call setup information with the temporary limit information removed, if such a parameter is used in the call setup information that the SCP should remove the temporary limit information for compliance with other equipment, for instance.
- The MSC 50 routes the call towards its recipient with signaling 6.

It is appreciated by ordinarily skilled persons, that for receiving any calls with recipient charging, the charging makes use of the sub-account while the temporary limit applies.

In an embodiment of the invention, the confirmation signal 3 is omitted.

The call ends when either party disconnects, or when the SCP 40 cuts the call because either the main account or the sub-account becomes empty. Then, in an embodiment of the invention, the SCP 40 sends a cost tracking message 7 to the subscriber terminal to indicate the cost of the call and/or the current balance of the sub-account.

Referring to the embodiment of the invention where in-band signaling is used, the application server 30 is not needed. The SCP 40 is then configured to detect the temporary limit from the in-band signaling. In a further embodiment, the confirmation signal 7 is also omitted.

Figure 2:
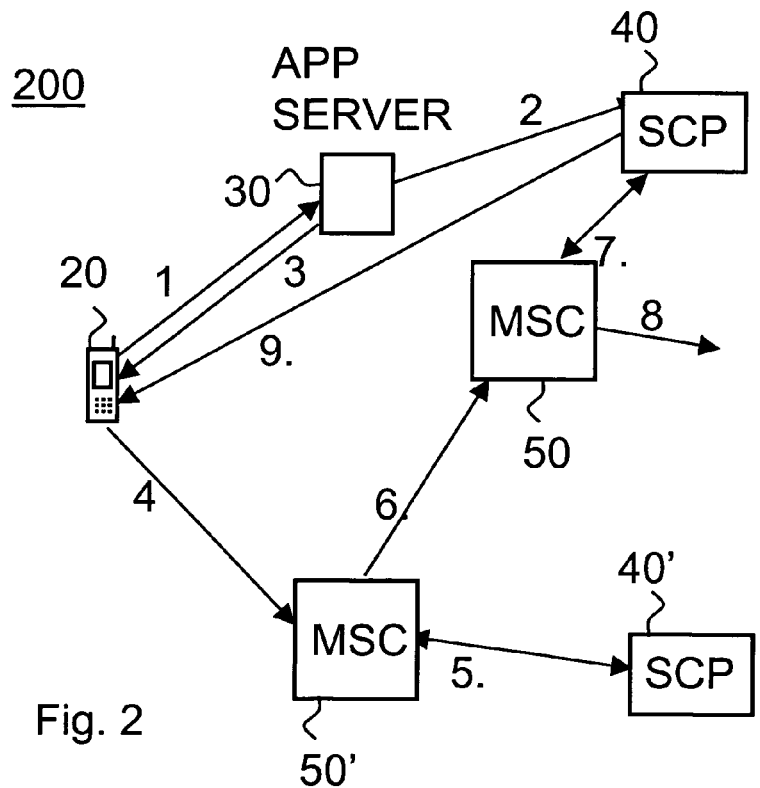
FIG. 2 shows schematically a system according to another embodiment of the invention.

FIG. 2 shows schematically a system 200 according to another embodiment of the invention. In addition to corresponding elements depicted with like reference numbers, FIG. 2 shows a main account system that comprises a main account switch centre 50' and a main account service control point 40'. FIG. 2 can be understood as a system in which a normal pre-paid system that comprises the main account switch centre 50' and control point 40' has been upgraded to support sub-accounts by addition of a sub-account switch centre 50, a sub-account SCP 40 and a sub-account application server 30. The sub-account switch centre 50, a sub-account SCP 40 and a sub-account application server 30 operate basically as disclosed in connection with FIG. 1 and have signaling depicted as 1 to 3 corresponding to that shown in FIG. 1.

In an embodiment illustrated by this FIG. 2, the signaling after signaling 3 contains: Signaling a call 4 as normal from the subscriber terminal to the main account switch centre 50' and directing the call establishment to the sub-account switch centre 50' with signaling 6. Next, the call is triggered with signaling 7 to the sub-account SCP 40' as a normal call.

In an embodiment of the invention, all calls are routed by the main account switch centre 50' to the sub-account switch centre 50 as shown by signal 6. This is typically implemented using a dedicated MSC routing category attribute.

In an embodiment of the invention, incoming calls are triggered to the sub-account SCP also with signaling 7 for monitoring against the temporary limit as in normal prepaid call service operation.

After completion of a call originated by the sub-account subscription from the subscriber terminal 20, the MSC 50 routes the call towards its recipient.

The sub-account calls end when either party disconnects, the sub-account SCP 40 cuts the call because sub-account has no more credit or the main account SCP 40' cuts the call because the main subscription has no more credit. After a call ends, the sub-account SCP 40' sends in an embodiment of the invention a cost tracking message 9 to the subscriber terminal 20 indicative of the cost of call and/or of the balance of the sub-account.

It is understood by those ordinarily skilled in the art that it may be necessary to adapt the tariffing between sub-account SCP 40 and the main account SCP 40', because otherwise differences in charging might be visible.

In other words, FIG. 2 can be called to illustrate imposing a subscription limitation in a system external to a normal prepaid system such that when the temporary limit is received, a specially designed service limitation system is configured to monitor service usage against an account initialized with the limit information.

Possibly both the normal prepaid system and the service limitation system then monitor service usage while the limit is active. The prepaid system then takes care of the charging of the main account. The limitation system takes care of monitoring the usage according to the temporary limit. When either system reaches the respective account limit, further service usage is denied.

Figure 3:
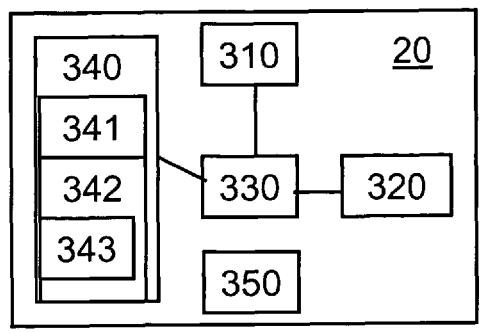
FIG. 3 presents a general structure of a subscriber terminal in FIG. 1.

FIG. 3 presents a general structure of the subscriber terminal 20. The subscriber terminal 20 comprises a communications block 310, a work memory 320, a non-volatile memory 330 comprising operating instructions, a processor 340 for executing the operating instructions and accordingly controlling other blocks of the user terminal, and a user interface 350 for providing output to a user and reading user input. The user interface 350 typically comprises, for data output, a display and/or a speaker. For data input, the user interface 350 typically comprises one or more of the following: dedicated buttons, soft keys, touch screen, roller, microphone, voice recognition circuitry, and pointing device. The processor is typically a master control unit MCU. Alternatively, the processor may be a microprocessor, a digital signal processor or an application specific integrated circuit. The subscriber terminal may be a fixed network terminal such as a PSTN or ISDN terminal or a mobile terminal such as a cellular or satellite terminal compatible with a standard or proprietary communications protocol.

Figure 4:
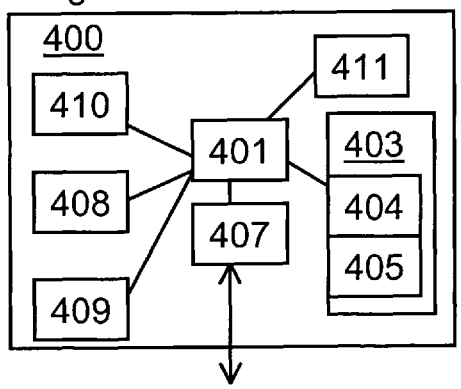
FIG. 4 presents a simplified block diagram of a server capable of operating as a switch centre or service control point of FIG. 1.

FIG. 4 presents a simplified block diagram of a server 400 capable of operating as a switch centre 50 or service control 40 point of FIG. 1, depending on its configuration. The server 400 comprises a memory 403 for storing computer program code 404, a processor 401 for controlling the operation of the server using the computer program code 404, a work memory 405 for running the computer program code 404 by the processor 401, a communication port 407 for communicating with other network elements and/or with subscriber terminals, a user interface 408 including data input and output circuitry, and a database 409 for storing any subscriber data and state information needed for the operation of the server.

Figure 5:
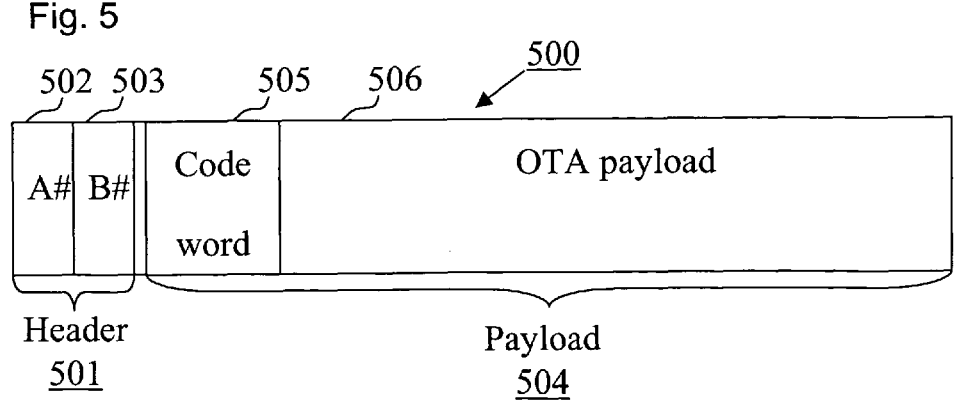
FIG. 5 presents a configuration message according to one embodiment of the invention.

FIG. 5 presents a configuration message 500 according to one embodiment of the invention, on the way to the subscriber terminal 20. The configuration message 500 is an Over The Air (OTA) configuration message for configuring the subscriber terminal to operate with a given telecommunication network equipment in order to adapt the subscriber terminal operable without physical service. The configuration message 500 is typically a short message. The configuration message 500 contains a header 501 with a sender field (A-subscriber) 502, a recipient field (B-subscriber) 503 and a payload field 504. The payload field 504 comprises a code word 505 indicating that the message is an OTA message and a content field 506 carrying a template for formatting the temporary information, for example. In one embodiment of the invention the payload of the content field (506) contains data formatted in Backus-Naur format or another grammar format capable of defining which signaling implementation (in-band, out-band, and which mechanism) is used for transferring the temporary limit and/or the format in which the temporary limit is to be transferred. Alternatively, this indication is provided in the header 501. For instance, the configuration message 500 in one case defines that calls are limited with in-band configuration of the called number in the form <dialled digits>#<limit units>*<limit subunits>#<tariff modifier> and in another case that calls are limited by sending an out-of-band SMS in the form <limit units>.<limit subunits>#<tariff modifier>#<number of calls to limit>.

The OTA configuration message 500 is adapted to configure the subscriber terminal to suitably adapt to the prevailing needs. In an embodiment, the configuration message 500 provides a signaling format for use in in-band signaling such as telephone number prefix or postfix such as +123456789#2*50 for 2.50 Euros temporary spending limit. The configuration message 500 in one embodiment is also adapted to indicate to the user interface (UI) that the current home or visited network supports the temporary limit. In an embodiment of the invention, the subscriber terminal's UI in turn is able to enable/disable various user interface options responsive to the OTA signaling. In an embodiment of the invention, the OTA signaling is carried out upon registration in a roaming network.

According to an embodiment of the invention, the main switch centre 50 is capable of delivering the configuration message 500 to the subscriber terminal either at the subscriber terminal's request or automatically when the subscriber terminal connects to the main switch centre 50. In another embodiment, the configuration message is sent by an external servers in response to the subscriber registering in a home or visited network.

Figure 6:
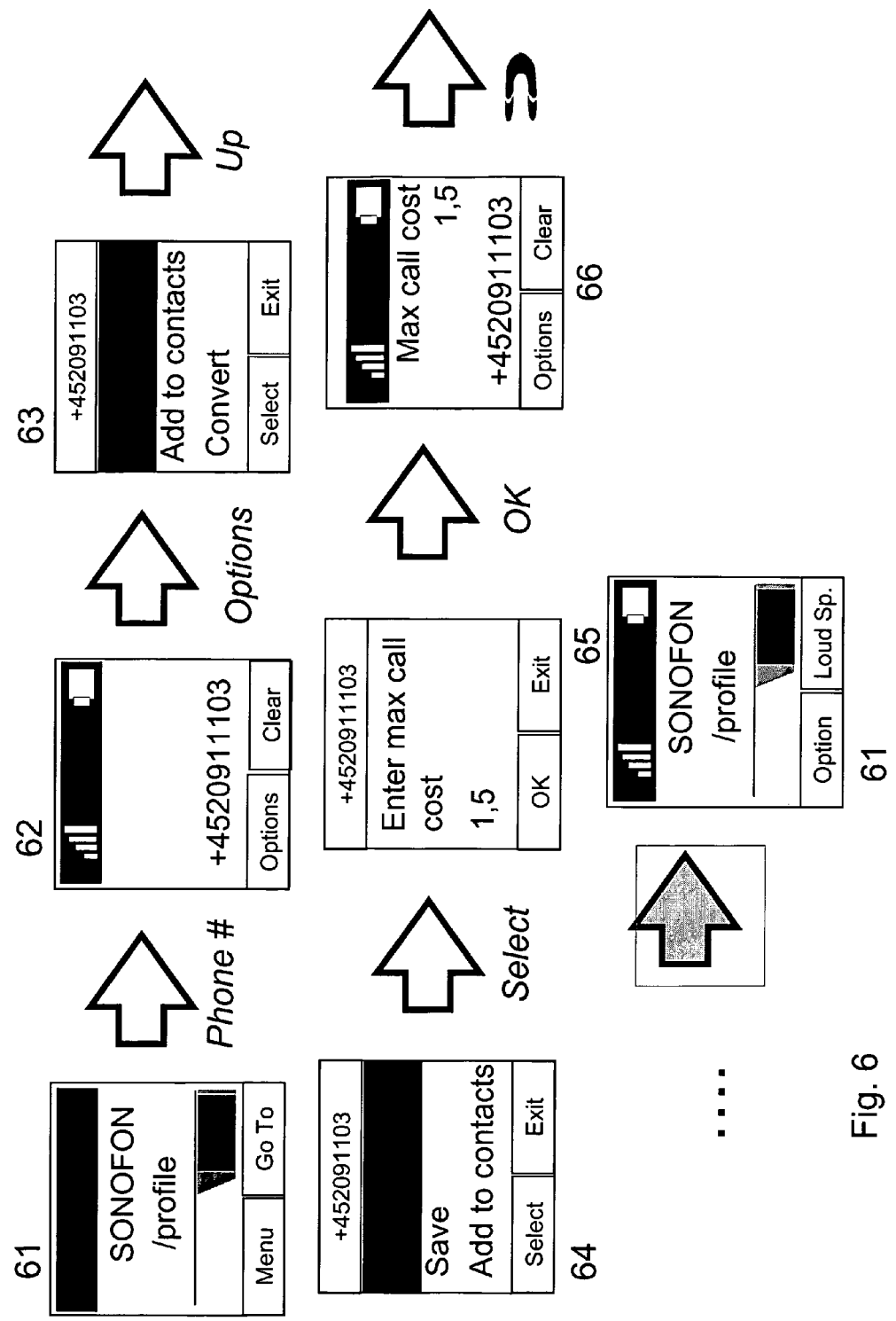
FIG. 6 shows a sequence of screen displays illustrating operation of a subscriber terminal according to one embodiment of the invention.

FIG. 6 shows a sequence of screen displays illustrating operation of a subscriber terminal according to one embodiment of the invention. As is understood from FIG. 3, the subscriber terminal 20 contains a processor and operating instructions according to which the subscriber terminal 20 is capable of running various applications and providing different services. In this embodiment, the subscriber terminal 20 comprises an application that simplifies the establishment of the temporary limit. Starting from display 61, the subscriber terminal 20 is in an idle mode, ready for placing or receiving phone calls. The user next enters a phone number shown in display 62 and selects soft key "options" to access various options for using the number entered. Scrolling up through screen 64 and selecting option "call payment", the user is prompted at screen 65 to enter a limit for the call being made. Next, the user confirms the input by soft key "OK" and starts a call to the desired number by pressing a calling key. After the call has terminated either to termination of either the caller or recipient, or the temporary limit has been met and conversely the network has terminated the call, the subscriber terminal resumes to the idle mode shown in display 61.

FIG. 6 demonstrates an example on temporary limit wherein the limit is set for only the next call. Without restricting to this option, the user terminal may also provide an option to set the temporary limit for a given time or number of following calls and/or messages. In one embodiment, the user terminal is further configured to provide the user with an option for defining a code with which the limit can be removed.

Regardless of whether a temporary limit is set for one or more events, FIG. 6 illustrates clearly how the subscriber terminal may hide the forming and sending of the in-band or out-band signaling required to set the temporary limit. In conjunction with the OTA configuration illustrated with FIG. 5, the subscriber station is capable of being configured to form appropriately formatted temporary limit signaling for the network and to subsequently signal desired temporary limits or their removal based on user input via the user terminal.

By providing a wizard in the user terminal 20 for formatting the temporary limit, possibly error-prone and non-attractive manual formatting may be avoided and the user may simply enter the amount of permitted use. For instance, in one example a limit of 2.5 Euro is indicated by a postfix exemplified by +123456789#2#50 for a 2.5 € call entry.

The user terminal 20 may be adapted to display an indication of a current temporary limit, its remaining time or value and/or of a forthcoming temporary limit the start date and/or time. The user terminal 20 may further be adapted to start displaying an indication of the current temporary limit on meeting a predetermined trigger such as receiving a warning message indicative of exhaustion of the temporary limit.

The terminal 20 typically has a graphical user interface, as is also exemplified by FIG. 6. The graphical user interface may comprise an input and an output, typically having a display and/or a speaker.

Referring to the concept that a temporary limit is applied by a charging system in a telecommunication network, it is appreciated that by performing a call limitation in the same place as the charging for a subscription, particularly prepaid subscription, provides accurate operation and also enables use of standard handsets in certain embodiments of the invention.

It is also possible to implement certain embodiments of the invention without installing new network equipment by simply renewing prepaid service logic is especially when the limit information is transferred in-band and the limitation is implemented in the prepaid system. There is an insignificant impact on the network performance also since the prepaid service normally analyses the information provided and continually monitors service usage anyway.

Further, a network based solution cannot be manipulated by the phone owner. This is relevant for the phone sharing case where trust between phone owner and borrower might be minimal. Both the lender and borrower may also trust in a solution that is controlled by a reliable telecommunications operator.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, devices, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

It should be appreciated that in this document, words comprise, include and contain are each used as open-ended expressions with no intended exclusivity. Further, terms such as "phone owner" and "subscriber" may be used interchangeably when they refer to the person who generally is entitled to control the associated main account. Moreover, whilst the subscriber terminal may typically be a telephone or phone in short, in alternative embodiments the terminal is a video terminal or a data terminal such as internet terminal.

The foregoing description has provided by way of non-limiting examples of particular implementations and embodiments of the invention a full and informative description of the best mode presently contemplated by the inventors for carrying out the invention. For instance, it is clear that the invention is usable equally well in fixed as in mobile networks as well in any communication networks generally and even though the invention may benefit from using readily existing equipment in case of prepaid subscriptions, it is also possible to implement for post-paid subscriptions. Hence, it is clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention could be used to advantage without the corresponding use of other features. As such, the foregoing description should be considered as merely illustrative of the principles of the present invention, and not in limitation thereof. Hence, the scope of the invention is only restricted by the appended patent claims.

We claim:

1. A method comprising:
    based upon an input in a mobile device, determining a temporary limit in regard to using the mobile device in a communication network, where use of the mobile device in the communication network is associated with a main wireless communication subscription having a main account;
    sending an instruction, comprising the temporary limit, by the mobile device to the communication network to:
        create a sub-subscription for the main wireless communication subscription, where the sub-subscription has a temporary sub-account, and where the sub-account is defined, at least partially, by the temporary limit, and
        subtract the temporary limit from the main account of main wireless communication subscription for the temporary sub-account with the creation of the sub-subscription;
    where the instruction is sent by a short message of a short messaging service in an out-of-band signaling which is separate from a telephone communication band of the mobile device to the communication network, where sending of the short message is hidden to a user at the mobile device;
    sending a signal from the mobile device to the communication network to remove the sub-subscription before an account balance reaches zero, and a remaining balance of the sub-account is at least partially refunded to the main account; and displaying in the mobile device an indication of current balance status of the temporary account.

2. A method as in claim 1 further comprising limiting use of the mobile device with the sub-subscription until a predetermined event.

3. A method as in claim 1 wherein the temporary limit is provided to the communication network with an out-of-band signaling.

4. A method as in claim 1 where the temporary limit comprises tariffing information elements and the method further comprises controlling the use of the temporary account including charging the temporary sub-account at a tariffed cost which is more expensive than a cost for the main wireless communication subscription; and displaying on the mobile device an indication of a current balance status of the temporary sub-account.

5. A method as in claim 1, wherein the instruction is a single instruction.

6. An apparatus comprising:
    a user interface configured to receive an input indicating a temporary limit in regard to using the apparatus in a wireless communication network, where the apparatus is a mobile device, where use of the mobile device in the wireless communication network is associated with a main wireless communication subscription having a main account;
    a communications unit configured to send an instruction, comprising the temporary limit, by apparatus to the wireless communication network to:
        create a sub-subscription for the main wireless communication subscription, where the sub-subscription has a temporary sub-account, and where the sub-account is defined, at least partially, by the temporary limit, and subtract the temporary limit from the main account of main wireless communication subscription for the temporary sub-account with the creation of the sub-subscription;

where the instruction is sent by a short message of a short messaging service in an out-of-band signaling which is separate from a telephone communication band of the mobile device to the communication network, where sending of the short message is hidden to a user at the mobile device;

wherein the mobile device is configured to send a signal to the communication network to remove the sub-subscription before an account balance reaches zero, and a remaining balance of the sub-account is at least partially refunded to the main account; and wherein the mobile device is configured to display an indication of current balance status of the temporary account.

7. An apparatus as in claim 6 where the apparatus is further configured to limit use of the mobile device with the sub-subscription until a predetermined event.

8. An apparatus as in claim 6 wherein the temporary limit contains any combination of: a monetary amount or a unit amount; a start date for application of the limit; a start time for application of the limit; an end date for expiry of the limit; an end time for expiry of the limit; the number of service events the limit applies to; and tariffing information elements.

9. An apparatus as in claim 6 wherein the communications unit is configured to send the temporary limit to the communication network with an out-of-band signaling.

10. An apparatus as in claim 6 where the apparatus is configured to remove the temporary account after the mobile device has issued a predetermined authorization.

11. An apparatus as in claim 6 where the temporary limit comprises tariffing information elements and the apparatus is further configured to control the use of the temporary account including charging the temporary sub-account at a tariffed cost which is more expensive than a cost for the main wireless communication subscription; and displaying on the mobile device an indication of a current balance status of the temporary sub-account.

12. An apparatus as in claim 6, wherein the instruction is a single instruction.

13. A non-transitory memory medium tangibly encoded with a computer executable program code executable by a processor to perform actions comprising:

based upon an input in a mobile device, determine a temporary limit in regard to using the mobile device in a communication network, where use of the mobile device in the communication network is associated with a main wireless communication subscription having a main account;

send an instruction, comprising the temporary limit, by the mobile device to the communication network to:
create a sub-subscription for the main wireless communication subscription, where the sub-subscription has a temporary sub-account, and where the sub-account is defined, at least partially, by the temporary limit, and
subtract the temporary limit from the main account of main wireless communication subscription for the temporary sub-account with the creation of the sub-subscription, where the instruction is sent by a short message of a short messaging service in an out-of-band signaling which is separate from a telephone communication band of the mobile device to the communication network, where sending of the short message is hidden to a user at the mobile device;

send a signal from the mobile device to the communication network to remove the sub-subscription before an account balance reaches zero, and a remaining balance of the sub-account is at least partially refunded to the main account; and display an indication of current balance status of the temporary account at the mobile device.

14. A method comprising:

based upon an instruction received from a mobile device in a wireless communication network, creating a sub-subscription to a main wireless communication subscription, where the main wireless communication subscription comprises a main account, and where the instruction comprises a temporary limit in regard to using the mobile device in the communication network with the sub-subscription;

based upon the instruction received from the mobile device, subtracting the temporary limit from the main account of main wireless communication subscription for the temporary sub-account with the creation of the sub-subscription;

limiting use of the sub-subscription to the temporary limit until a predetermined event; and receiving a signal from the mobile device to remove the sub-subscription before an account balance reaches zero, and a remaining balance of the sub-account is at least partially refunded to the main account, where the instruction is received by a short message of a short messaging service in an out-of-band signaling which is separate from a telephone communication band of the mobile device to the communication network.

15. A method as in claim 14, wherein the instruction is a single instruction.

16. An apparatus comprising:

an input configured to receive an instruction from a mobile device in a wireless communication network, where a main wireless communication subscription of the apparatus comprises a main account, and where the instruction comprises a temporary limit in regard to using the mobile device in the communication network;

a controller configured, in response to receipt of the instruction, to:
create a sub-subscription comprising a sub-account of the main wireless communication subscription, and
subtract the temporary limit from the main account of main wireless communication subscription for the temporary sub-account with the creation of the sub-subscription, where the instruction is received by a short message of a short messaging service in an out-of-band signaling which is separate from a telephone communication band of the mobile device to the communication network; and wherein the apparatus is configured to receive a signal from the mobile device to remove the sub-subscription before an account balance reaches zero, and a remaining balance of the sub-account is at least partially refunded to the main account.

17. An apparatus as in claim 16, wherein the instruction is a single instruction.

18. A non-transitory memory medium tangibly encoded with a computer executable program code executable by a processor to perform actions comprising:

based upon an instruction received from a mobile device in a wireless communication network, create a sub-subscription to a main wireless communication subscription, where the main wireless communication subscription comprises a main account, and where the instruction comprises a temporary limit in regard to using the mobile device in the communication network with the sub-subscription;

based upon the instruction received from the mobile device, subtract the temporary limit from the main account of main wireless communication subscription for the temporary sub-account with the creation of the sub-subscription;

limit use of the mobile device with the sub-subscription until a predetermined event; and receive a signal from the mobile device to remove the sub-subscription before an account balance reaches zero, and a remaining balance of the sub-account is at least partially refunded to the main account, where the instruction is received by a short message of a short messaging service in an out-of-band signaling which is separate from a telephone communication band of the mobile device to the communication network.

\* \* \* \* \*